Figures 1, 2:
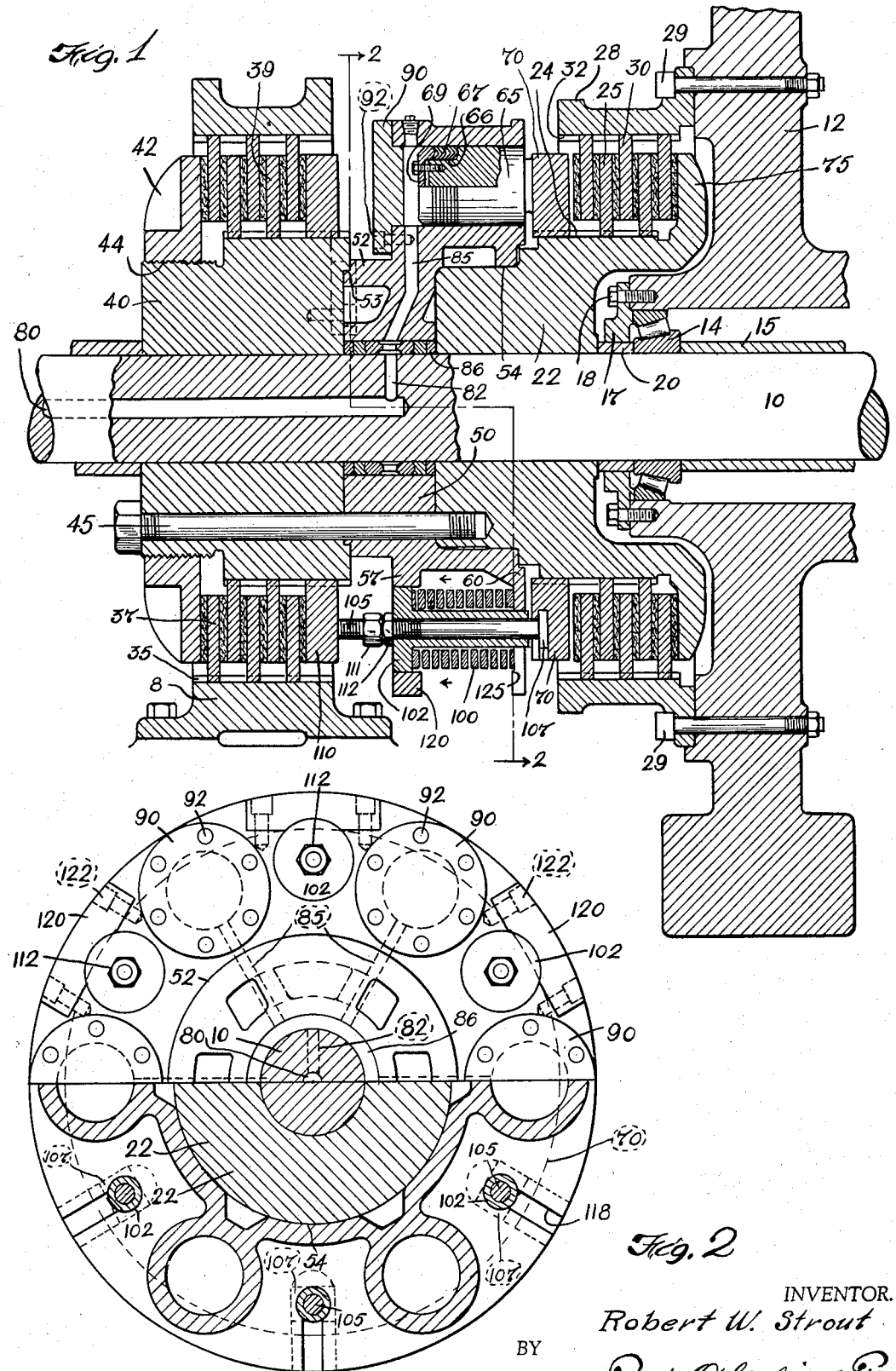

Aug. 27, 1940.    R. W. STROUT    2,213,111
POWER DRIVE MECHANISM
Filed April 11, 1938

INVENTOR.
Robert W. Strout
BY
Ray, Oberlin & Ray
ATTORNEYS

Patented Aug. 27, 1940

2,213,111

UNITED STATES PATENT OFFICE 2,213,111

POWER DRIVE MECHANISM

Robert W. Strout, Brooklyn, N. Y., assignor to E. W. Bliss Company, Brooklyn, N. Y., a corporation of Delaware Application April 11, 1938, Serial No. 201,296

14 Claims. (Cl. 192—18)

This invention relates to devices for the transmission of power between a driving element and a driven element, and more particularly to fluid actuated control means operable according to the will of the operator for frictionally connecting and disconnecting the driving element with the driven element, together with braking means coincidentally operative with the disconnection of the driven and driving elements to apply a brake and stop the rotation of the driven element. In the preferred form the invention contemplates hydraulic rather than pneumatic operation.

Combination brake and clutch control devices are old and have been used for a considerable length of time. Such mechanisms have, however, been difficult of assembly and particularly difficult to disassemble easily for repair. In so far as I am aware it has heretofore been necessary to effect a substantial dismantling of all the parts in order to permit ready access to the control means. Since such control devices are normally used with a combination brake and clutch mounted on a shaft and are normally disposed therebetween, it was necessary to axially shift the component parts to effect the above mentioned dismantling. This was a costly and time consuming operation and prevented use of the entire mechanism linked therewith during such idle time.

Therefore the chief object of my invention has been to provide a clutch and brake control device which may be very easily dismantled for replacement and repair. Another object has been to provide positive means for engaging the clutch together with spring actuated means operative coincidentally with clutch disengagement to apply a braking action to the driven element and restrain it from further motion.

Still another object of my invention has been to devise a novel clutch and brake control mechanism to be used in connection with power presses and similar machinery, although it is not intended to limit the invention to such use.

Other objects of the invention will become apparent from the following specification when interpreted in connection with the accompanying drawing. The novel features are summarized in the claims.

In said annexed drawing:

Fig. 1 is a transverse section axially through my improved clutch and brake; and Fig. 2 is a composite section through Fig. 1, as indicated by the lines 2—2 thereon.

Referring now to the drawing, I provide a brake housing 8, through which passes a centrally disposed drive shaft 10 idly carrying a flywheel 12 on suitable bearings 14. As indicated, my invention is particularly adapted for use in presses. In such case the flywheel is continuously driven by belting from a suitable motor and the shaft 10, through gearing, drives the crank which reciprocates the die slide. Connection of the flywheel and shaft therefore operates the press.

Fixedly carried by the shaft 10 is a clutch spider 22, preferably keyed thereon and which supports the driven plates of the clutch. The spider is formed with a cylindrical outer portion provided with teeth 24. A series of driving clutch plates 25 are slidably supported on the said cylindrical portion and rotate therewith while axially slidable thereon along the teeth 24. Each side of the plates 25 is provided with conventional frictional clutch facing.

The outer driven members of the clutch are carried by the flywheel 12. To this end I provide a clutch shell 28 bolted to the flywheel as at 29 and supporting outer clutch plates 30. Teeth 32 on the inner face of the shell permit axial movement of the plates 30 while restraining the same to rotate with the flywheel.

The aforementioned clutch construction is functionally duplicated in the brake. Thus, the brake housing is provided with an inner cylindrical surface in which are formed axially extending teeth 35 to slidably receive clutch plates 37. The said plates are positioned to be frictionally engaged by corresponding clutch plates 39 slidably supported by teeth on the outer periphery of a brake spider 40. An adjusting disk 42 is threadingly secured to an external hub 44 of the brake spider. To maintain the brake friction disks in the desired operating position the brake and clutch spiders are secured together by long bolts 45. The bolts also function to secure in position the center portion 50 of the assembly, which includes the clutch and brake actuating mechanism.

The center portion of the assembly comprises an annular hub 52 positioned with respect to the brake spider by a shoulder 53 and positioned with respect to the clutch spider by the machine surfaces indicated at 54. A pair of flanges 57 and 60 are carried by the hub and form portions of the piston cylinders for actuating the clutch and the spring mechanism for applying the brake.

The clutch cylinders, as shown in Fig. 2, are six in number, spaced equidistantly about the periphery of the assembly. Carried in each cylinder is a piston 65 which is provided with cylinder packing 67, maintained in position by a retainer ring 69 bolted to the said piston. All of the six pistons are adapted to coact simultaneously with a clutch disk or pressure plate 70, which in turn is guided by the teeth 24 of the clutch spider 22. As the pistons are actuated and moved to the right, as shown in Fig. 1, the pressure plate shifts clutch disks 25 and 30 axially until further motion is prevented by the outwardly extending spider flange 75. At this time the pressure holding the clutch disks together is sufficient to overcome the inertia of the driven shaft assembly and connect the same with the flywheel to rotate as a unit therewith.

The pistons are preferably actuated by hydraulic rather than pneumatic means. In this connection the supply system and the piston and cylinder packing are of such a nature that leakage of the liquid and resultant throwing of the same by the rotating parts is eliminated. To supply liquid to the cylinders the shaft 10 is drilled along its axis, as at 80, to a region adjacent the mid-portion hub 52. Here a second hole 82 is drilled in the shaft intersecting the hole 80. A fluid connection 85 leads from the drilled holes of the shaft to each of the clutch cylinders and permits the application of fluid under pressure against the pistons 65 from a supply source connected to the shaft at the remote end of the drilled hole 80. Packing members 86 prevent loss of fluid pressure at the junctions of the hub 52 with the clutch and brake spiders respectively.

The pistons 65 are each provided with a portion 66 of reduced diameter at the top part in which is seated a nest of conical ring-shaped packing members 67. These rings are retained in position and expanded against the cylinder walls by the retainer rings 69. Access to the packing in each cylinder is secured by providing for each cylinder an individual cap member 90 bolted thereto as at 92 and removable without dismantling the assembly. It is thus relatively simple to supply new piston packing as desired. To accomplish this it is only necessary to remove the cap and retainer ring, whereupon the old packing may be removed and new substituted. Similarly, the oil line may be readily blown out in the same manner and thus any accumulation of dirt which goes past the strainer of the supply line is readily removed from the system.

After the operating cycle of the unit has been completed and it is desired to disengage the clutch it is also necessary to coincidentally therewith apply the brake to frictionally restrain the uncoupled driven shaft 10 from further movement. It is this function which is accomplished by the inter-disposed brake friction plates carried by the housing 8 and the brake slider 40 already described. To apply the brake I provide a spring actuated mechanism which functions, not only to apply the brake but to draw the pressure plate 70 away from the clutch plates and permit their separation.

As above indicated, it is highly desirable to provide such mechanism in a form to permit ready dismantling for replacement and repair to conserve both time and labor. For this reason the brake applying units are individually removable and are six in number, spaced intermediate the cylinders annularly about the flanges 57 and 60. Each unit consists of a compression spring 100 bearing at one end against the flange 60 and at the other end against the head of a hollow bushing or sleeve 102, the head of which is circular and adapted to slide axially in a short cylinder of the flange 57.

As the fluid pressure is released the springs are permitted to elongate and withdraw the clutch pressure plate from engagement with the clutch friction plates and also apply the brake. This is effected through bolts 105, each provided with a head 107 supported, as shown in Fig. 1, in a radial T-slot of the pressure plate 70 and restrained against axial movement with respect thereto. The opposite end of each bolt bears against a brake pressure plate 110 which controls the shifting of the brake friction plates. A pair of lock nuts 111 and 112 permit adjustment of the sleeve 102 to properly limit the expansion of the spring 100 and adjust the pressure with which the brake disks are forced together and hence the retarding moment of the brake.

The friction plates of the brake housing and spider are adjustable axially as a group by the adjusting disk 42, which may be turned in or out to properly position them for engagement when the pressure plate 110 is shifted to the left by the springs 100.

It will be apparent that as the pistons 65 are actuated and the clutch pressure plate 70 is shifted to the right to engage the clutch the remote ends of the bolts 105 will be drawn away from the brake pressure plate and permit the brake friction plates to disengage. There is thus a positive brake release at the time the clutch is applied. Similarly, as the hydraulic pressure supplied by the pipe lines 80 and 85 is released and the pistons 65 are free to shift to the left (Fig. 1) the heavy springs 100 will simultaneously apply the brake and shift the clutch pressure plate to permit disengagement of the clutch friction disks. Hence on release of the hydraulic pressure there is a positive application of the brake and release of the clutch.

To permit easy replacement each spring unit, including bolt 105, spring 100 and sleeve 102, is removable radially from its supported position without dismantling the clutch and brake unit. For this reason the head 107 of each bolt is supported in a radial T-slot as heretofore stated, and as shown in Fig. 1. The flange 60 is provided with corresponding radial slots 118, to also permit removal of the bolt and sleeve 102 associated therewith.

The sleeve receiving cylinders of the flange 57 are each provided at their outer peripheral portion with a removable wall segment 120 normally secured in place by bolts 122 to complete the said cylinders. As shown in Fig. 2 the removal of one of these segments permits the removal of the corresponding sleeve retained in position thereby.

Each spring unit of the brake applying mechanism may thus be readily removed independently of the others and without dismantling the clutch and brake unit. This is accomplished by releasing the compression in the desired spring 100 by turning off the nuts 111 and 112, thus allowing the bushing or sleeve 102 and the spring to be moved to the left (Fig. 1) to draw the latter beyond the slight shoulder 125, by which the right-hand end is positioned. Upon removal of the cap 120 the spring assembly may be removed radially, the bolt head and body sliding out of the radial slots in the pressure plate 70 and the flange 60, respectively.

From the foregoing description it will be apparent that I have provided a novel clutch and brake control mechanism which is capable of easy repair and the component parts of which may be dismantled without disassembly of the entire unit.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In mechanism for engaging a pair of friction drive surfaces, a hub with a plurality of slideways therein and a radial face thereon, a friction member rotatable therewith, a second friction member adapted to engage with said first member and means to engage said members comprising a thrust member slidably mounted in each slideway, a spring interposed between each thrust member and said radial face, a removable segment forming part of each slideway wall by which said thrust member may be removed through the space covered thereby and an operating connection between each thrust member and one of said friction members.

2. In mechanism to drivingly engage a pair of friction surfaces, a shaft, a hub mounted thereon, a plurality of sideways formed therein, an abutting face on said hub in registration with and spaced from each sideway, a hollow member slidably carried in said slideway, a spring interposed between said member and said face, a rod passing through said member and shiftable to engage said friction surfaces and an abutment on said rod to be engaged by said hollow member and thereby transmit the spring thrust to the friction faces.

3. In mechanism to drivingly engage a pair of friction surfaces, a shaft, a hub mounted thereon, a plurality of slideways formed therein, an abutting face on said hub in registration with and spaced from each slideway, a removable segment carried by said hub and forming part of said slideway, a hollow member slidably carried in said slideway, a spring interposed between said member and said face, a rod passing through said member and shiftable to engage said friction surfaces and an abutment on said rod to be engaged by said hollow member and thereby transmit the spring thrust to the friction faces.

4. In mechanism to release a pair of friction surfaces, a shaft, a hub mounted thereon, a plurality of slideways formed therein, an abutting face on said hub in registration with and spaced from each slideway, a removable segment carried by said hub and forming part of said slideway, a hollow member slidably carried in said slideway, a spring interposed between said member and said face, a rod passing through said member and shiftable to release said friction surfaces and an abutment on said rod to be engaged by said hollow member and thereby transmit the spring thrust to release the friction faces.

5. In mechanism to release a pair of friction surfaces, a shaft, a hub mounted thereon, a plurality of slideways formed thereon, an abutting face on said hub with a slotted opening in registration with each slideway, a removable segment carried by said hub and forming part of said slideway, a hollow member slidably carried in said slideway and removable through said opening, a spring interposed between said member and said face, a rod passing through said member and said opening and shiftable to release one of said friction surfaces, an abutment on said rod to be engaged by said hollow member and thereby transmit the spring thrust to release the friction faces.

6. In mechanism for releasing a pair of friction drive surfaces, a hub with a plurality of slideways therein and a radial face thereon, a frictional member rotatable therewith, a second friction member adapted to engage with said first member and means to release said members comprising a thrust member slidably mounted in each slideway, a spring interposed between each thrust member and said radial face, a removable segment forming part of each slideway wall by which said thrust member may be removed through the space covered thereby and an operating connection between each thrust member and one of said friction members.

7. In mechanism for releasing a clutch and simultaneously applying a brake, a hub with a plurality of alternate cylinders and slideways therein and a radial face formed thereon, shiftable friction members forming parts of the clutch and brake respectively, pistons in said cylinders to shift the clutch members, links interposed between said brake and clutch members to shift the members as a unit and means tending to normally shift the links and members to engage the brake and disengage the clutch including thrust members slidable in said slideways and engaging the links and springs interposed between said thrust members and said hub radial face, said links, link shifting means and springs being radially removable from said hub.

8. In mechanism for shifting a part of a friction power transmitting unit, a shaft, a friction plate carried by said shaft, a flanged hub carried by said shaft and rotatable with said friction plate, a plurality of cylinders in said hub, pistons in said cylinders operatively connected to said plate, slideways in said hub, passages through said hub flange in alignment with said slideways, T-slots in said plate in alignment with said passages and said slideways, members slidable in said slideways and passing through said passages respectively, heads on said members adapted to removably lie within said T-slots respectively, sleeves encircling each member and slidable in said slideways, and engaging abutments on said members and springs interposed between said sleeves and said flanged hub to shift said friction plate.

9. In mechanism for shifting a part of a friction power transmitting unit, a shaft, a friction plate carried by said shaft, a flanged hub carried by said shaft and rotatable with said friction plate, a plurality of cylinders in said hub with their axes parallel to said shaft, pistons in said cylinders operatively connected to said plate, slideways in said hub parallel to said shaft, passages through said hub flange in alignment with said slideways, T-slots in said plate in alignment with said passages and said slideways, members slidable in said slideways and passing through said passages respectively, heads on said members adapted to removably lie within said T-slots respectively, sleeves encircling each member and slidable in said slideways, and engaging abutments on said members and springs interposed between said sleeves and said flanged hub to shift said friction plate.

10. In mechanism for operating a part of a friction power transmitting unit, a shaft, a friction plate carried by said shaft, a flanged hub carried by said shaft and rotatable with said friction plate, a plurality of cylinders in said hub with their axes parallel to said shaft, pistons in said cylinders operatively connected to said plate, slideways in said hub parallel to said shaft, removable cap members secured to said hub and forming part of said slideways respectively, passages through said hub flange in alignment with said slideways, T-slots in said plate in alignment with said passages and said slideways, members slidable in said slideways and passing through said passages respectively, heads on said members adapted to removably lie within said T-slots respectively, sleeves encircling each member and slidable in said slideways, and engaging removable abutments on said members, springs interposed between said sleeves and said flanged hub to shift said friction plate, said members, sleeves and springs being respectively removable by removing said cap members and passing a respective sleeve and member outwardly through the opening formed by said removed cap.

11. In mechanism for releasing a clutch and simultaneously applying a brake, a shaft, a clutch plate and a brake plate mounted thereon, a flanged hub carried by said shaft and rotatable with said plates, a plurality of cylinders in said hub with their axes parallel to said shaft, pistons in said cylinders operatively connected to said clutch plate through one end of said cylinders respectively, removable cap members in the other ends of said cylinders respectively, a second series of cylinders in said hub parallel to said shaft, passages through said hub flange in alignment with said second cylinders respectively, T-slots in said clutch plate in alignment with respective passages and cylinders, hollow sleeve members slidable in said cylinders, rods passing through said sleeves and through said passages respectively, heads on said rods adapted to removably lie within said T-slots respectively, removable abutments carried by said rods and adapted to be engaged by said sleeves, springs interposed between said sleeves and said flanged hub, said rods each abutting said brake plate, means to apply fluid pressure to said cylinders, said springs acting on the release of said fluid pressure to simultaneously shift said clutch plate and said brake plate.

12. In mechanism of the character described, a clutch pressure plate, a brake pressure plate, a hub, means carried by said hub for simultaneously releasing the clutch pressure plate and applying said brake pressure plate, and means for removably securing said first-named means to said hub, said first-named means being radially removable from said hub upon removal of said securing means.

13. In mechanism of the character described, a clutch pressure plate, a brake pressure plate, a hub therebetween, means operatively connected to said clutch pressure plate for simultaneously releasing the clutch pressure plate and applying the brake pressure plate, said means comprising bolts and springs normally urging said bolts toward said brake pressure plate, and means for removably securing said first-named means to said hub, said bolts and springs being radially removable from said hub upon removal of said securing means.

14. In mechanism of the character described, a clutch pressure plate, a brake pressure plate, a hub, said hub and clutch pressure plate having radially extending recesses therein adjacent the periphery thereof, means mounted in said recesses for simultaneously releasing the clutch pressure plate and applying said brake pressure plate, and means for preventing removal of said first-named means from said recesses, said means comprising segments removably secured to said hub and permitting removal of said first-named means radially from said recesses upon removal of said last-named means from said hub.

ROBERT W. STROUT.